Patented Aug. 13, 1940

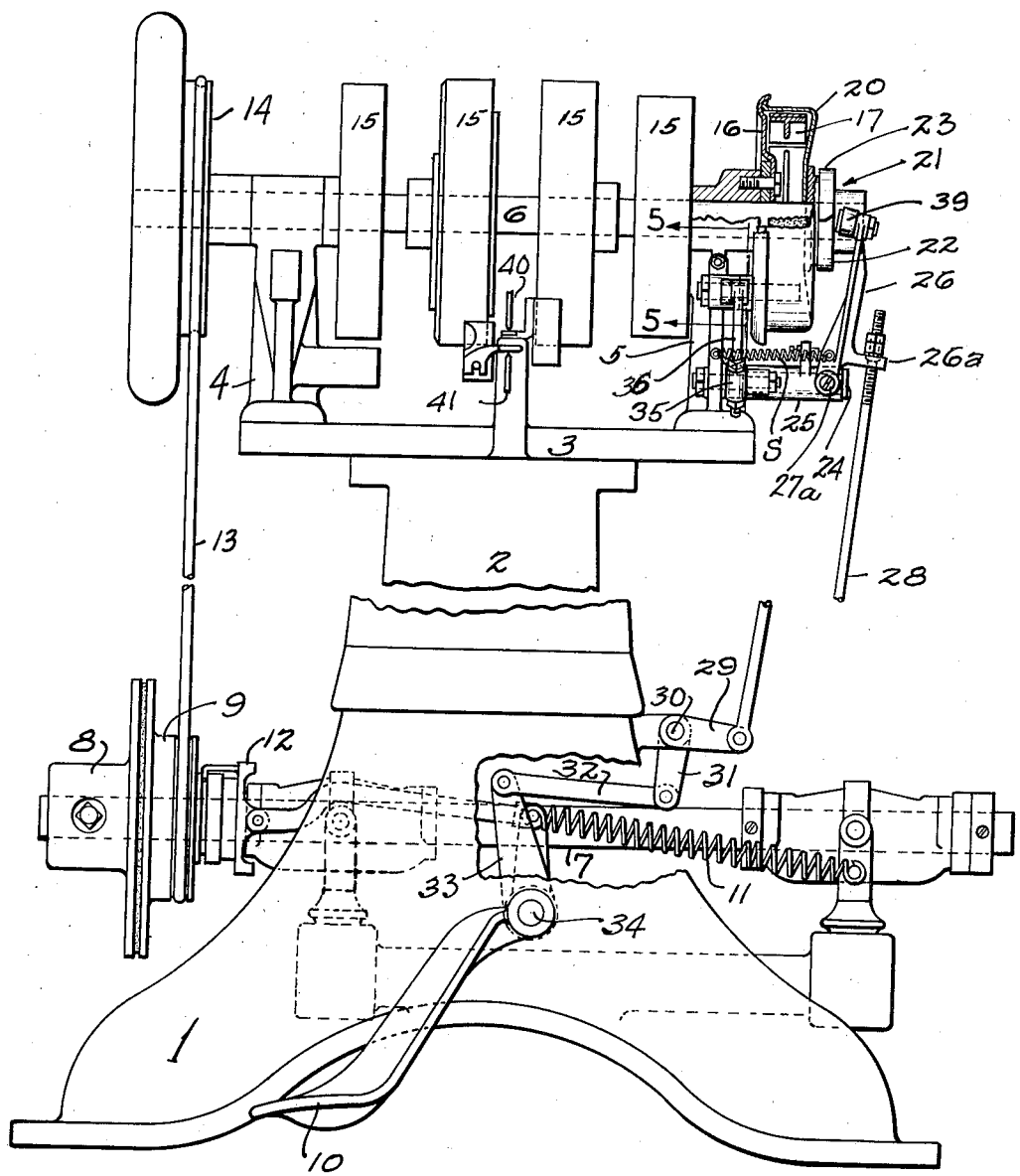

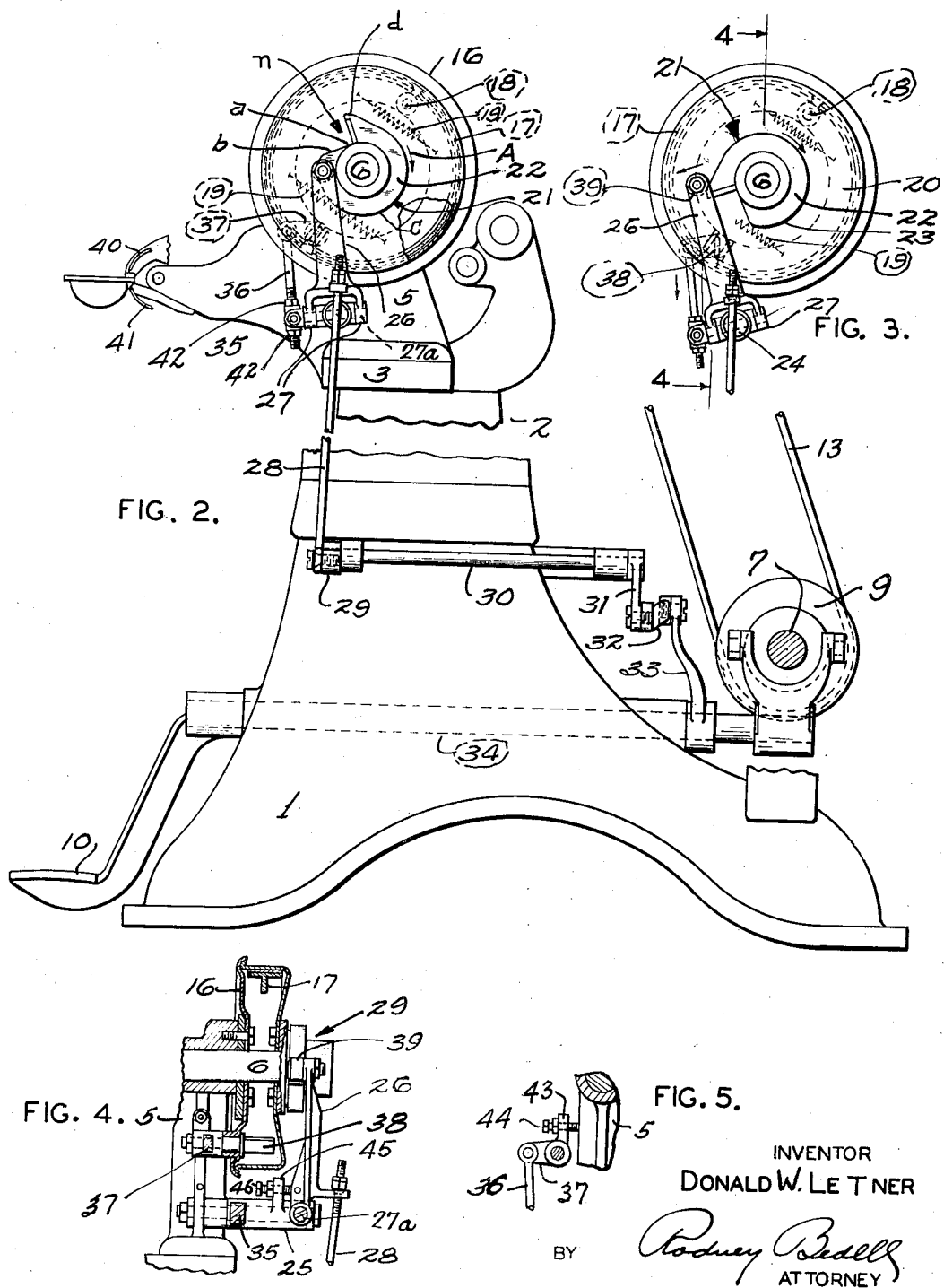

2,211,279

UNITED STATES PATENT OFFICE 2,211,279

MACHINE BRAKE

Donald W. Letner, Casey, Ill., assignor to Landis Machine Company, St. Louis, Mo., a corporation of Missouri Application September 22, 1938, Serial No. 231,123

4 Claims. (Cl. 188—135)

The invention relates to braking devices for machine operating shafts and mechanisms driven thereby such as are utilized in shoe working machinery particularly, and in the following specification and accompanying drawings the invention is illustrated as applied to a shoe stitcher of familiar type.

One of the objects of the invention is to provide a machine brake structure which will function automatically upon disengagement of the machine driving clutch.

Another object of the invention is to brake the machine from full speed to a stop during a single cycle of operation of the machine and, incidentally with this object, to insure the initial application of the brake at a definite point in the cycle of the machine operation.

Another object of the invention is to provide a brake structure of the type referred to which may be applied to a machine previously manufactured without reconstructing the machine.

These and other detailed objects of the invention indicated in the following specification are attained by the structure illustrated in the accompanying drawings, in which—

Figure 1 is a front elevation of the head and base of a curved needle shoe stitcher, the intermediate portion of the machine column being omitted.

Figure 2 is a side elevation of the structure shown in Figure 1 looking towards the same from the right.

Figure 3 is a detail of the brake structure as shown in Figure 2 but showing the parts in a different position.

Figure 4 is a detail section taken on the line 4—4 of Figure 3.

Figure 5 is a detail section taken on the line 5—5 of Figure 1.

The machine frame comprises a base 1, a column 2, and a table 3, with brackets 4 and 5 journaling the machine operating shaft 6. A driving shaft 7 journaled in the machine base mounts a fixed pulley 8 and a loose pulley 9 having clutch faces adapted to engage each other when foot treadle 10 is depressed, which elongates a clutch release spring 11 and permits the clutch collar 12 to thrust the loose pulley towards the fixed pulley. Belt 13 extends from the driving pulley to the driven pulley 14 on shaft 6. Cams 15 drive the needle, awl, presser foot, thread takeup and lock, looper, and other machine parts (not shown) in the usual manner and in themselves form no part of the present invention.

Secured to the outer face of bracket 5 is a plate 16. Semi-circular brake shoes 17 are pivoted at 18 to plate 16. Springs 19 normally draw the pivoted ends of shoes 17 towards each other as shown in Figure 2.

Fixed to the portion of shaft 6 projecting outwardly beyond plate 16 is the brake drum 20 having a periphery opposing brake shoes 17, the edge of the drum periphery being seated in an annular groove in plate 16.

Fixed to shaft 6 outwardly of drum 20 is a disc 21 having an annular face 22 facing towards the end of the shaft and having a peripheral face 23 forming a cam having a low point $a$, a rise $b$, a dwell $c$, and a high point $d$.

A stud 24 projects outwardly from bracket 5 and mounts a sleeve 25. A lever arm 26 has its lower end bifurcated at 27 and connected by a pivot pin 27a to the outer end of sleeve 25. A spring S tends to pull arm 26 to the left of its position shown in Figure 1 but arm 26 may be held in the position shown against the tension of spring S by a link 28 connecting an extension 26a on the arm to one arm 29 of crank shaft 30, the other arm 31 of which is connected by a link 32 to a crank arm 33 on the treadle shaft 34.

An arm 35 on the inner end of sleeve 25 has a link connection 36 to a member 37 pivoted on plate 16 and terminating in a flat cam-like element 38 projecting between the ends of brake shoes 17 and movable from the position shown in Figure 2 to the position shown in Figure 3 to separate the brake shoes and thrust them against brake drum 20. When the foot treadle is depressed and clutch elements 8 and 9 are engaged to operate the machine, link 28 is pulled down to hold arm 26 in the position shown in Figure 1, and brake shoe springs 19 are free to hold the brake shoes in the position shown in Figure 2 and out of engagement with brake drum 20.

When pressure is removed from treadle 10, spring 11 releases clutch 8—9 and the downward pull on arm extension 26a is released, leaving spring S free to pull the arm to the left. A cam roller 39 maintained on the upper end of arm 26 engages the annular face 22 of disc 21 until the notch $n$ in the disc periphery comes abreast of roller 39, permitting the latter to enter the notch and engage the peripheral cam 23. Further rotation of the cam in the direction indicated by the arrow A moves arm 26 towards the front of the machine, rotating sleeve 25 and arm 35 to pull link 36 and member 37 downwardly, separating the brake shoes to provide frictional contact with the brake drum, slowing down the rotating shaft for approximately 250° of the shaft's rotation, whereupon the roller 39 rides up the high point *d* of the cam, further rotating sleve 25 and member 37 to effect greater separation of brake shoes 17 which more firmly engage brake drum 20 and bring the machine to a stop with the parts in the position shown in Figure 3. French and Meyer Patent No. 473,870 is illustrative of the stitcher mechanism so far as the same is important to the understanding of the present invention.

Disc 21 and its peripheral cam 23 are angularly related to cams 15 so that the machine is stopped at a desired point in the cycle of operations with the curved needle 40 and awl 41 out of the work so that it is unnecessary for the operator to turn the machine by hand forwardly or rearwardly before he can remove the work from the machine. Obviously if it be desired to stop the machine at any other point in the cycle of operations, it would be a simple matter to vary the angular relation between disc 21 and cams 15 to effect the desired result. Link 36 is adjustably connected to arm 35 by nuts 42 whereby the thrust of the brake shoes against the brake drum may be made as heavy as necessary to bring the machine to a stop at the desired point. This adjustable connection also provides means for taking up wear between the brake friction surfaces and for compensating for play in the brake actuating parts.

The angular position of arm 26 about the axis of sleeve 25 is normally determined by the thrust of the ends of the brake shoes on the cam element 38 and the connection between the latter and sleeve 35. Since this position may be affected by various factors, such as the tension of springs 19, the wear of the brake shoes, etc., it is desired to positively prevent arm 26 moving in a clockwise direction (looking at Figures 2 and 3) so far that cam roller 39 engages the hub of disc 21. To limit such movement of the arm, member 37 (Figure 5) has an upstanding finger 43 carrying an adjustable stud 44, the inner end of which may bear against frame bracket 5.

To limit the angular movement of arm 26 about its pivotal mounting on sleeve 25, the latter is provided with an upstanding finger 45 (Figure 4) adjustably mounting a stud 46, the point of which engages arm 26 to limit the anti-clockwise movement of the latter so the cam roller rides squarely on the cam end and does not move inwardly and bear against the side of the brake drum.

These and other details of the structure are not essential, and the exclusive use of modifications omitting these details and otherwise varying the structure but retaining the spirit of the invention as expressed in the claims is contemplated.

What is claimed is:

1. In combination with an operating shaft, a device for braking said shaft, a disc mounted on said shaft the periphery of which disc forms a cam having a low point, a rise and dwell, and a high point, there being an abrupt drop from said high point to said low point whereby an outwardly and laterally facing notch is provided in said disc, means for controlling said braking device comprising a part rotatable in opposite directions to apply or release the brakes, an arm having a pin connection to said part for rotating said part and movable about said connection to swing transversely of the direction of rotation of the latter, said arm having an element at its outer end arranged to ride on said cam, said arm normally being held with said element abreast of the side of said disc and out of contact with said cam but movable into said notch, as said disc rotates, to be engaged by the low point of said cam and to set the braking device as said element and arm is moved by the remainder of said cam.

2. In combination, a machine frame, an operating shaft journalled thereon, a brake drum on said shaft, friction elements movable on said frame to engage said drum, a disc fixed on said shaft and having a peripheral cam, a pivot structure on said frame spaced from said disc, an arm mounted on said structure to be swung in a plane parallel to said shaft to bring its outer end into and out of opposition to said cam and also to be swung in a plane extending transversely of said shaft by the engagement of the outer end of said arm by said cam, manually controlled means for effecting the first-mentioned movement of said arm to thrust said elements against said drum.

3. In combination, a machine frame, an operating shaft journalled thereon, a brake drum on said shaft, friction elements movably mounted on said frame for engaging said drum, a disc on said shaft forming a radial cam, a stud on said frame substantially parallel with said shaft and spaced from said disc, a sleeve rotatable on said stud, a pivot on said sleeve extending transversely of said stud, an arm mounted to swing on said pivot to bring its outer end in opposition to said cam, an operative connection between said sleeve and said friction elements for thrusting the latter toward said drum when said arm and sleeve are moved by said cam, and manually operable means for swinging said arm on said pivot to move the outer end of said arm on said pivot away from said disc.

4. In a machine frame, a bracket forming a journal bearing, an operating shaft seated in said bearing, shaft braking elements on said bracket and shaft alongside of said bearing, a disc on said shaft alongside of said braking elements and forming a radial cam and an adjacent annulus, a stud on said bracket and parallel to the axis of said shaft and disc, a sleeve rotatable on said stud and having a part operatively connected to said braking elements, a pivot on said sleeve with its axis extending transversely of the axis of said sleeve and stud, a lever arm carried on said pivot with its outer end disposed to be moved about said pivot into and out of opposition to said cam and to be moved by said cam to rotate said sleeve to cause said part to apply said brake elements.

DONALD W. LETNER.